3,275,456
NATURAL GUT-COLORED FIBROUS MEAT CASING

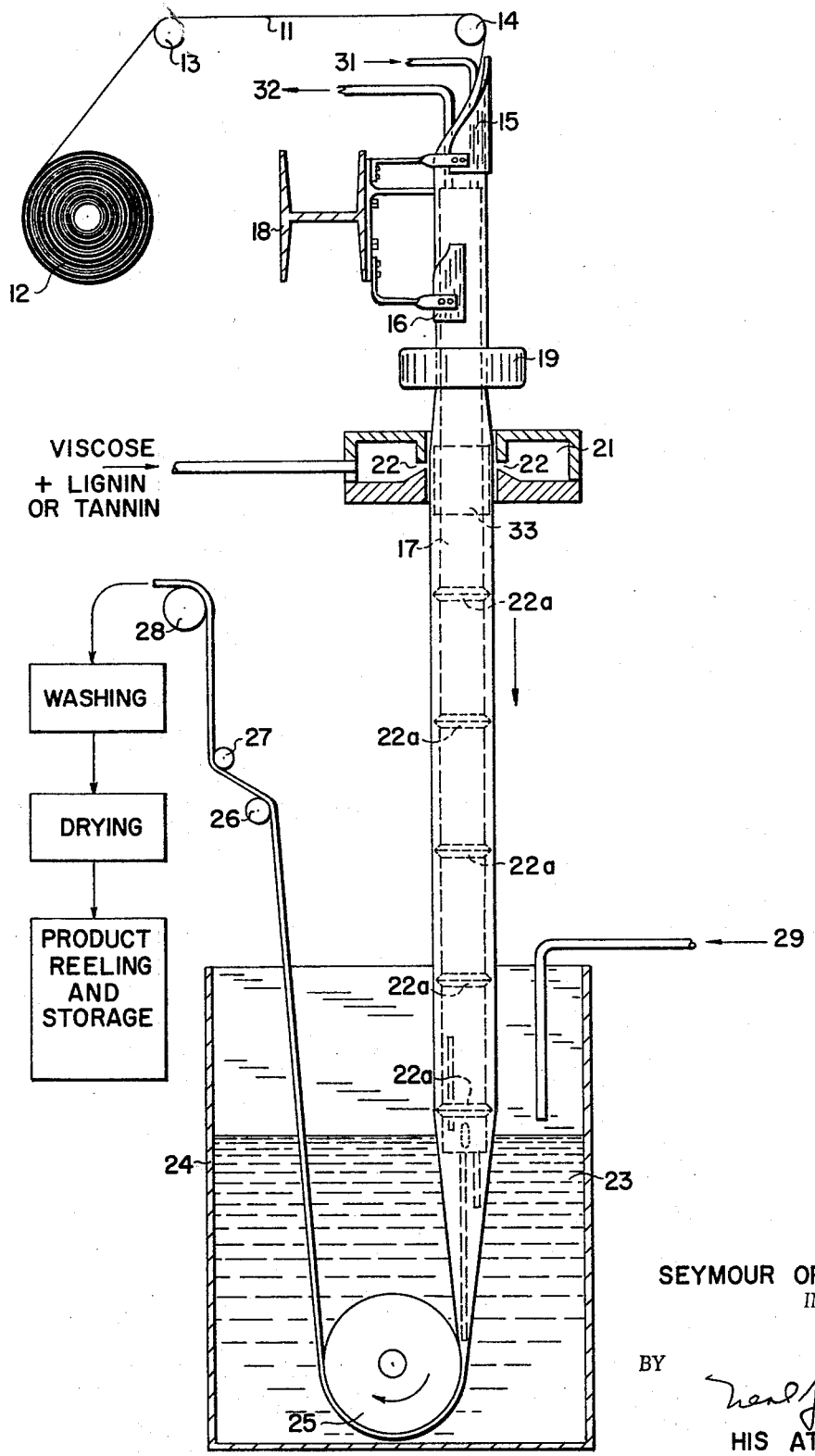

Seymour Oppenheimer, Chicago, Ill., assignor to Tee-Pak, Inc., Chicago, Ill., a corporation of Illinois
Filed Jan. 27, 1964, Ser. No. 340,329
6 Claims. (Cl. 99—176)

This invention relates to new and useful methods for preparation of fibrous cellulosic casings having a color approximating that of a smoked, natural gut casing.

In the preparation of articles of regenerated cellulose by extrusion of viscose into a coagulating medium, the in situ formation of colors has become extremely important for certain specific applications. The coloring of transparent packaging films of regenerated cellulose has become a serious problem, especially where such films were to be used in food packaging or in meat casings. The FDA standards for dyes, pigments and other colorants used in food packaging material have become much stricter in recent years. As a result, some manufacturers have stopped making colored packaging films because of the difficulty and expense of meeting FDA standards. It would be desirable to have dyes that are completely nontoxic so whether or not they can be extracted by packaged foods or other materials is not important. Under present FDA regulations, one must prove the nonextractability of dyes to a lower limit that is not clearly defined or conduct expensive feeding tests on animals to prove nontoxicity under conditions of use.

In the manufacture of synthetic meat casings of regenerated cellulose, the procedures have become relatively standardized over many years of manufacturing such casing. Unreinforced or nonfibrous casings are generally made by extruding viscose through an annular die into a coagulating medium to form a tubular film of desired size and weight. In some cases, viscose is extruded through a slit to form a film or sheet of regenerated cellulose which is subsequently cemented or otherwise joined along a longitudinally extending joint to form a tube suitable for use as a casing.

Fibrous casings are formed by extrusion of viscose through a die along with a fibrous reinforcing material curved into tubular or cylindrical form, followed by regeneration of the cellulose in an acid regenerating bath. The standard commercial procedure for the formation of fibrous casing involves the continuous feeding of a sheet of long fiber paper, such as a hemp paper, over rollers or other guide members which cause the paper to curve into a tubular shape and pass through the extrusion die in the form of a cylinder, while the viscose solution is simultaneously extruded through the die to saturate and coat the paper. The subsequent regeneration of the viscose in the acid bath results in the formation of a tube of paper-reinforced, regenerated cellulose, known in the meat packing industry as fibrous casing. As previously noted, there is a substantial demand for a satisfactory method of coloring regenerated films and casings, particularly fibrous casings, during the initial formation thereof using nontoxic colorants.

It is, therefore, one object of this invention to provide a new and improved process for the preparation of colored fibrous casings approximating the color of a smoked natural gut casing.

Another object of this invention is to provide an improved fibrous cellulosic casing having a color approximating that of a smoked, natural gut casing.

Still another object of this invention is to provide a novel colored, fibrous, cellulosic casing in which the colorant is completely nontoxic.

A feature of this invention is the provision of an improved process for preparation of colored, fibrous, cellulosic casings by addition of lignin or tannin in admixture with the viscose used in the preparation of casing.

Another feature of this invention is the provision of a new and improved fibrous, cellulosic casing having a color approximating that of smoked, natural gut casing, produced by forming a cellulosic tissue paper into an elongated tube, impregnating and coating the paper tube with a viscose solution containing a small amount of lignin or tannin, and regenerating the cellulose from the viscose impregnated in and coated upon the paper tube.

Other objects and features of this invention will become apparent from time to time throughout the specification and claims as hereinafter related.

Summary of the invention

This invention consists of a novel process for preparation of a colored, fibrous, cellulosic casing in which the coloring component is completely nontoxic.

As described above, the formation of fibrous casing by extrusion of viscose through an annular die, together with a tube of a long-fiber, tissue paper into an acid bath or cellulose regenerating medium is well known in the art. In the preparation of fibrous casing, a strip of tissue paper is drawn from a large roll and passed through a suitable guide to cause it to curve about a longitudinal axis to form a tube with overlapping longitudinal margins.

The tube passes through an annular die or ring which is provided with a slit for extrusion of viscose. The viscose extruded from the die impregnates and coats the paper tube. The impregnated, coated tube then passes into a coagulating and regenerating bath, usually an acid bath, and is subsequently washed and dried. In the past, fibrous casings have been prepared using bleached hemp tissue papers, with the result that the fibrous casing produced is translucent and white. In fact, in some cases, the paper has been mercerized to produce a more translucent product.

This invention is based upon the discovery that lignin or tannin (or soluble derivatives thereof) can be incorporated in the viscose used in impregnating and coating tissue paper used in the preparation of fibrous casing to produce casing having a nontoxic, nonextractable color which approximates the color of smoked, natural gut casing. In carrying out this process, the steps followed are substantially identical to those used in the prior art except that the lignin or tannin (or soluble derivatives thereof) is dispersed in the viscose which is used to impregnate and coat the fibrous paper.

In carrying out this invention, the lignin or tannin (or derivatives thereof) used can be a material of relatively high purity or may be the crude product obtained in the purification of wood pulps. Lignin and tannin are closely related chemically and are often produced by substantially the same extractive techniques. In the past, lignin and tannin were considered to be distinct materials. In recent years, however, it has been determined that these terms actually define a group of many separate and distinct compounds. At one time, lignins were considered to be complex polysaccharides. In fact, a scientific encyclopedia of twenty-five years ago stated, "lignin and cellulose are the chief constituents of wood. Lignins are complex substances of unknown composition believed to be polysaccharides. In the manufacture of paper from wood, it is necessary to remove the lignin, and this is often accomplished by treatment of the wood fibers with such agents as sulfur dioxide-carbon bisulfide, sodium sulfide, or sodium hydroxide." More recent work has classified the lignins into a variety of compounds derived from various woods and other natural cellulosic materials. The lignins are now considered to be polymeric polyphenols. The tannins are substances of high molecular weight but in many cases are less polymerized than the lignins. The extractable tannins are often found in the same cellulosic fibers as the lignins. The tannins are polymeric phenolic materials having a polycyclic and heterocyclic structure. Lignins and tannins have characteristic brown colors and are readily convertible to water soluble sulfonate derivatives.

In carrying out this invention, the tannin or lignin (or sulfonate derivative) is prepared in an alkaline solution, preferably in aqueous ammonia, and is added to viscose in a weight ratio of 2.5 parts per 100 parts cellulose in the viscose. This solution or dispersion of tannin or lignin in viscose is then used in the preparation of fibrous casing as hereinafter described.

Referring to the drawing, there is shown a somewhat diagrammatic view of the process and apparatus used in the preparation of fibrous casing in accordance with this invention. In the drawing, a ribbon of paper 11, which is formed of natural cellulosic fibers, and which is preferably a long-fiber, hemp paper weighing 12½ pounds per ream, passes from roll 12 over rollers 13 and 14 and around guides 15 and 16 which form the paper into tubular form.

The paper then proceeds downwardly over mandrel 17 which may be a steel pipe having an outside diameter of two to seven inches, more or less, depending upon the size of the tube or casing which is to be produced. The mandrel 17 may be of a suitable length, conveniently about thirty feet long, and, as shown, can be suspended from a suitable support such as an I beam 18 or the like. The paper ribbon 11, now shaped in the form of a tube, passes downwardly over the mandrel 17, through a forming ring 19 which is a metallic ring having an inside diameter slightly larger than the diameter of the paper tube passing through it. The forming ring 19 functions to maintain the paper in the form of a tube until it reaches the coating die 21.

Coating die 21 is a hollow annular structure of metal or the like and contains an annular opening 22, circumferentially of its inner face, through which viscose is applied to the outer surface of the downwardly moving paper tube. Viscose is supplied under positive pressure from the chamber of die 21 through the annular slit 22 to thoroughly impregnate and coat the paper tube which is moving downwardly through the die. The viscose supplied through die 21 contains a small amount of tannin added to the viscose as a solution in 1 N aqueous ammonia in a weight ratio of 2.5 parts tannin per 100 parts cellulose in the viscose solution. While this proportion of tannin to cellulose is effective, smaller or lesser quantitatives can be used, e.g. 0.5–5 parts tannin per 100 parts cellulose.

The sleeve 33, formed of metal or the like, which is shrunk onto the mandrel 17, functions to effect more uniform application or viscose through the orifice 22 as the paper tube 11 passes downwardly thereover. A number of slip rings 22a are positioned on mandrel 17 at preselected intervals. The slip rings 22a are preferably shrunk onto the mandrel at about three-foot intervals and function to keep the inside wall of the viscose-impregnated, paper tube from scraping against the outside wall of mandrel 17 as the tube moves downwardly.

Continuing in its downward movement, the viscose-impregnated, paper tube 11 enters coagulating bath 23 contained in vessel 24. Coagulating bath 23 is preferably 5% sulfuric acid. On contact with the acid bath, the viscose impregnated in and coated upon paper tube 11 is coagulated and regenerated. The conversion of viscose to regenerated cellulose begins and continues within the bath as the tube moves around roller 25 and continues as the tube moves over and under wiper rods 26 and 27, roller 28, and then through washing baths and drying tunnels not shown here, but being substantially the same as those used in the art of making regenerated cellulose casings, as exemplified in United States Patent 1,937,225 and related patents. For convenience in understanding the overall intention, the steps of washing, drying and reeling and storage of the product casing are shown diagrammatically without reference to any particular apparatus for accomplishing those steps.

In carrying out the acid regeneration of cellulose in the paper tubing, acid for the bath 23 is supplied through pipe 29. The same kind and concentration of acid is supplied to the interior of the casing through the mandrel 17 through a pipe 31. Spent acid from within the casing is withdrawn through pipe 32 at a rate which is balanced by the incoming acid, as shown. In the preparation of casing in accordance with this process, the speed of the casing in its downward movement is approximately 20–25 feet per minute and the contact time in the acid bath 23 is of the order of 29–36 seconds.

The fibrous casing which is produced in this process is a tough, strong casing useful in the preparation of large sausages such as bolognas and the like. The fibrous casing which is produced in this process has a nontoxic, nonextractable color which approximates that of smoked, natural-gut casing. This color is an ivory-brown with a slight gray-green cast. The color cannot be accounted for merely by the color of the lignin or tannin (or derivative thereof) in the viscose used in the formation of the casing. The color in the finished product is apparently the result of a chemical interaction between the color existing in the lignin or tannin (or derivative thereof) and the chemicals used in the preparation of the casing. While this color can be obtained with a number of different tissue papers, including wood and cotton base papers, the best results are obtained using a hemp paper as described above. The hemp paper has long fibers of very high strength which cooperate with the lignin or tannin and contribute to the production of a strong fibrous casing having the desired color.

In the procedure described above, tannin was dissolved in 1 N aqueous ammonia and added viscose in a weight ratio of 2.5 parts per 100 parts cellulose in the viscose. The colored viscose solution was used as described in the preparation of a colored, fibrous casing. When lignin is dissolved in an alkaline solution of the same composition and mixed with viscose, used in the production of fibrous casing, the resulting casing has the desired color. It has also been found that soluble derivatives of lignins and tannins can be used in the same manner. A solution of a crude sodium lignosulfonate was similarly added to viscose in a weight ratio of 2.5 parts lignin per 100 parts cellulose. The colored viscose was used in the preparation of fibrous casing having the desired color. Soluble sulfonate derivatives of tannins can be used in the same manner. While the above described examples specify a lignin or tannin concentration of 2.5 parts by weight per 100 parts cellulose in the viscose, greater or lesser amounts can be used, e.g. 0.5–5.0 parts per 100 parts cellulose. The variation in amount of lignin or tannin (or derivatives) used results in a variation in intensity of color. As previously noted, the color which is obtained is not that attributable to the color of the lignin or tannin in the viscose but apparently results from the chemical interaction with the various reagents used in the preparation of the casing.

While this invention has been described fully and completely with special emphasis upon several preferred embodiments of the invention, it is to be understood that within the scope of the appended claims, this invention may be practiced otherwise than as specifically described herein.

What is claimed is:

1. A method of preparing a fibrous cellulosic meat casing having a color approximating that of a smoked natural gut casing which comprises forming a tube from a tissue paper of natural cellulosic fibers, preparing a colored viscose solution by addition to viscose of an alkaline solution containing lignin, tannin or soluble derivatives thereof in the proportion of 0.5–5.0 parts by weight per 100 parts cellulose in the viscose, impregnating the paper tube with said colored viscose, regenerating cellulose in the viscose impregnated tube, and washing and drying the product casing.

2. A method in accordance with claim 1 in which the material added to the viscose is in an aqueous ammonia solution.

3. A method in accordance with claim 1 in which the material added to the viscose consists of lignin in an aqueous ammonia solution.

4. A method in accordance with claim 1 in which the material added to the viscose consists of tannin in an aqueous ammonia solution.

5. A method in accordance with claim 1 in which the material added to the viscose is a solution of sodium lignosulfonate.

6. A method in accordance with claim 1 in which the tissue paper is a longer fiber hemp paper.

References Cited by the Examiner

UNITED STATES PATENTS

| | | | |
|---|---|---|---|
| 1,158,400 | 10/1915 | Cohoe | 99—176 |
| 2,063,279 | 12/1936 | Walter | 99—176 |
| 2,223,057 | 11/1940 | Bosel et al. | |
| 2,802,745 | 8/1957 | Bosel | 99—176 |
| 2,952,550 | 9/1960 | Parlour | 99—176 |
| 3,106,471 | 10/1963 | Firth | 99—176 |
| 3,135,613 | 6/1964 | Underwood | 99—176 |
| 3,150,984 | 9/1964 | Broadhead | 99—176 |

OTHER REFERENCES

Wilson, "The Chemistry of Leather Manufacturer," 1929, second edition vol. II, published by The Chemical Catalog Co., Inc., New York, pp. 509, 510, 511, 774, 775 and 776.

A. LOUIS MONACELL, *Primary Examiner.*

HYMAN LORD, *Examiner.*